(No Model.)

H. H. HAAFF.
ANIMAL TAG.

No. 427,075. Patented May 6, 1890.

Witnesses.
Will R. Onohundro.
Wm. Rheem.

Inventor.
Heman H. Haaff
By Jno. G. Elliott
Atty.

UNITED STATES PATENT OFFICE.

HEMAN H. HAAFF, OF CHICAGO, ILLINOIS.

ANIMAL-TAG.

SPECIFICATION forming part of Letters Patent No. 427,075, dated May 6, 1890.

Application filed February 11, 1888. Serial No. 263,689. (No model.)

*To all whom it may concern:*

Be it known that I, HEMAN H. HAAFF, a citizen of the United States, residing in the city of Chicago, in the county of Cook and State of Illinois, have invented certain new and useful Improvements in Animal-Tags, of which the following is a specification.

This invention relates to improvements in animal-tags. Tags have heretofore been applied to the ears of animals by passing a narrow strip of thin metal through a slit made in the ear and bending such strip around the edge of the ear, and by passing a wire through the ear and attaching a tag to such wire; but such applications of tags are objectionable, as they are liable to be broken or torn out by being caught by the rubbing of the animal to relieve the ear, or by producing sores which in time permit of the falling out, particularly with flat strips, which give cutting-edges. Ear-tags are necessarily small, and their special marks are indistinguishable, except at close range and at the side tagged, which renders inspection difficult and detracts largely from their value, especially when the animals roam over a wide range of pasture. All of these objections and difficulties are overcome by the use of my improved tags and by their location upon the animal.

Figure 1:
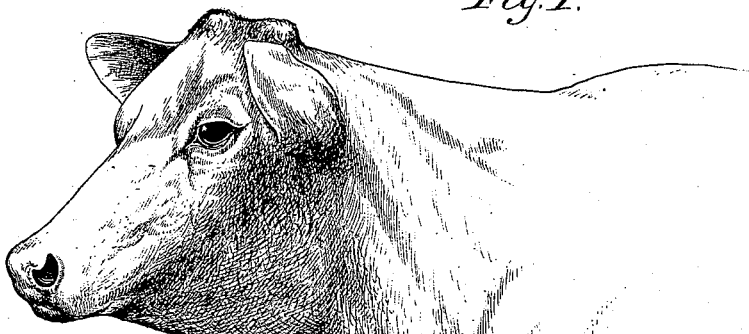
Figure 2:
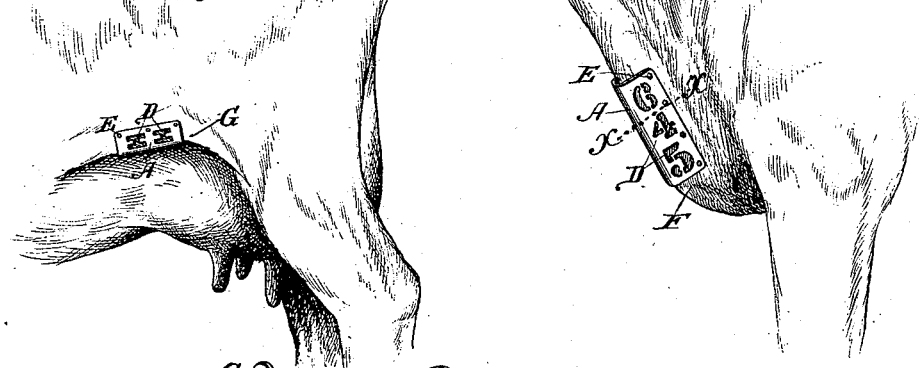
Figure 3:
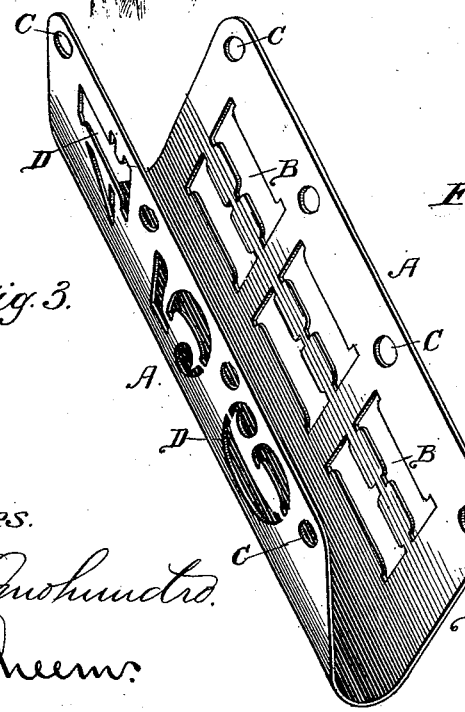
Figure 4:
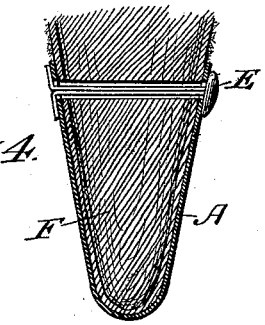

In the drawings, Figure 1 represents my tag in side elevation and illustrates its attachment to the brisket of a cow. Fig. 2 is a similar view of the tag, and illustrates its attachment to the flank of a cow. Fig. 3 is a perspective view of my tag, showing the manner of marking it, and also about the minimum size at which it is used. Fig. 4 is a transverse section through the tag and brisket on the line $x$ $x$, Fig. 1, illustrating a means for securing the tag in position.

The tag A is preferably made of sheet metal, and when so made the blank from which it is formed while in a flattened condition has stamped out next one edge the ownership-letters B, which, as shown in the drawings, are three letters "H," and between these letters and the adjacent edge of the flank there is a series of perforations C for inserting the retaining devices which hold the tag in position, as hereinafter described. Near the opposite edge I also form identifying-numerals D and perforations C. The identifying-numerals shown are "4," "5," and "6," which, when properly read, means the bull, steer, or cow No. 456, which number, with a record, may be used to indicate the age and pedigree of the animals, the date of purchase, &c. The letters may be a private mark or initials indicating ownership.

My invention is not limited to the use of letters shown or their arrangement with reference to each other or the tag, for it is obvious that either letters or figures may be used to the exclusion of the other, and that other symbols may be substituted.

The metal blank so formed and having the letters, figures, or symbols cut or stamped through or so as to remove the metal is then bent lengthwise to a substantially-U-shaped form, as shown, or such a form as will adapt it to receive either the brisket or dewlap or the flank of the animal, as shown in Figs. 1 and 2; and while, as before stated, sheet metal—galvanized, tinned, or otherwise—is preferably employed, because cheap, durable, and answering the purpose, these tags may be made of any other metal, of vulcanized rubber, or any fibrous material possessing the required strength and durability, bent to the form and shape, as before stated; nor is my invention limited to making the blank rectangular, as indicated, for such a blank may be square, round, or oval, and, in fact, of any arbitrary or desired form, so long as it is capable of having substantially the bent form shown, to enable it to embrace the brisket or flank, to which it is to be secured by fastening devices suitable for that purpose.

As one means of securing this tag to the brisket, dewlap, or flank of the animal, I have shown a McGill fastener E, passing through opposing perforations in the tag and brisket and clinched upon the outer face of the tag; but it is obvious the same ends may be accomplished by a rivet, by a wire passed through and bent at both ends, or by lacing of wire, rawhide, or fibrous material, by passing the same in and out of the several perforations, and also through the brisket in the manner of lacing.

By providing a series of perforations along the opposite edges of the tag and employing a number of attaching devices passed through said perforations the tag is secured from pivotal action, whereby the animal would be liable to cutting and torture. In this connection it should be observed that before applying the tag the necessary perforations are made in the brisket, dewlap, or flank of the animal and allowed to heal, for by this means the flank, dewlap, or brisket is not only prepared, but is in a perfectly healthy condition for receiving the tag.

In practice the brisket or dewlap is the preferable point for attaching the tag, although, as before indicated, the flank may be used, for both of these parts, as compared with the ear, have a very rapid circulation of blood, and therefore do not rot under any circumstances, and are never frozen until the animal is dead from freezing.

When perforated symbols are used and the tags are secured to either the brisket, dewlap, or flank, and by reason of the tag lying flat against the hair of the animal, the color of the flesh or the color of the hair, as the case may be, serves to give prominence to the symbols and enables them to be distinguished at quite a distance, and besides this the location of the tag at this point enables the employment of the tag and symbols larger and more distinct than can be employed when the tags are secured to or suspended from the ears.

Other advantages occur in securing the tag to the brisket, such as seeing the marks or symbols on opposing sides of the tag, and the tag cannot affect injury to the animal, and the reduced liability of its accidental detachment, while at the same time the tag is conveniently accessible for removal or renewal when desirable, and it is not liable to be feloniously removed, for after it has been in place a comparatively short time the metal deadens the hair beneath it, while the hair within the openings is not affected, so that it leaves an appearance of a brand when removed, which remains a long time, and if the tag remains a long time this effect becomes permanent, and branding, cutting, or permanent disfiguration of cattle is rendered unnecessary.

Having thus described my invention, what I claim is—

The animal-tag composed of a strip of sheet metal doubled or bent longitudinally, with coinciding perforations along its edges and distinguishing marks or characters cut entirely through its sides, and adapted for use substantially in the manner and for the purposes specified.

HEMAN H. HAAFF.

Witnesses:
WILL R. OMOHUNDRO,
ALBERT M. BENNETT.